United States Patent [19]

Watanabe

[11] 4,414,065

[45] Nov. 8, 1983

[54] METHOD FOR PREPARING A CHLORINATED VINYL AROMATIC POLYMER

[75] Inventor: Hiroyuki Watanabe, Shin-nanyo, Japan

[73] Assignee: Toyo Soda Manufacturing Co., Ltd., Shin-nanyo, Japan

[21] Appl. No.: 407,945

[22] Filed: Aug. 13, 1982

[30] Foreign Application Priority Data

Sep. 9, 1981 [JP] Japan .................................. 56-140905

[51] Int. Cl.$^3$ .............................................. C25B 3/06
[52] U.S. Cl. ...................................................... 204/81
[58] Field of Search ........................................ 204/81

[56] References Cited

U.S. PATENT DOCUMENTS

| | | | |
|---|---|---|---|
| 3,386,899 | 6/1968 | Shepard et al. | 204/81 |
| 3,692,646 | 9/1972 | Mather, Jr. et al. | 204/81 |
| 3,812,061 | 5/1974 | Barrett | 260/2.1 E |
| 4,264,750 | 4/1981 | Anand | 525/356 |
| 4,376,019 | 3/1983 | Gamlen et al. | 204/81 |

FOREIGN PATENT DOCUMENTS

| | | | |
|---|---|---|---|
| 48-16995 | of 1973 | Japan | 204/81 |
| 53-146786 | 1978 | Japan | 204/81 |
| 1016485 | 1/1966 | United Kingdom | 204/81 |
| 857099 | 8/1981 | U.S.S.R. | 204/81 |

OTHER PUBLICATIONS

Robert K. Jenkins et al., -"Chlorination of Polystyrene" (1968) Journal of Applied Polymer Science vol. 12, pp. 2059-2066.

Primary Examiner—Howard S. Williams
Assistant Examiner—Terryence Chapman
Attorney, Agent, or Firm—Oblon, Fisher, Spivak, McClelland & Maier

[57] ABSTRACT

A method for preparing a chlorinated vinyl aromatic polymer, comprises dissolving a vinyl aromatic polymer represented by the general formula

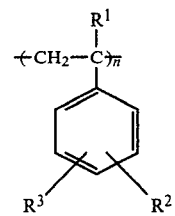

where $R^1$, $R^2$ and $R^3$ may be the same or different and each represents hydrogen or a $C_1$-$C_6$ lower alkyl group, and n is an integer of from 50 to 30,000, in an organic solvent, and subjecting it to an electrolytic reaction in the presence of an aqueous solution containing chlorine ions.

17 Claims, No Drawings

METHOD FOR PREPARING A CHLORINATED VINYL AROMATIC POLYMER

BACKGROUND OF THE INVENTION

1. Field of the Invention

The present invention relates to a method for preparing a chlorinated vinyl aromatic polymer, and more particularly to the preparation of a chlorinated vinyl aromatic polymer (hereinafter referred to simply as "chlorinated polymer") having solvent resistance, fusion resistance, heat resistance and fire resistance and having substantially the same molecular weight distribution as the molecular weight distribution of the starting material vinyl aromatic polymer (hereinafter referred to simply as "polymer") by dissolving the polymer in an organic solvent and subjecting it to an electrolytic reaction in an aqueous solution containing chlorine ions.

2. Description of the Prior Art

The vinyl aromatic polymer is widely used as a molding material since it is readily processable and has good transparency, colorability and electric properties. However, it is inferior in the solvent resistance, heat resistance and fire resistance. It has been an important objective in this technical field to improve such properties.

On the other hand, it is known to improve the properties of the polymer by chlorinating it. For instance, it is known to chlorinate the polystyrene in a solvent such as carbon tetrachloride in the presence of a catalyst such as benzoyl peroxide with use of a chlorinating agent such as chlorine, N-chlorosuccinimide or sulfuryl chloride (For instance, Japanese Unexamined Patent Publication No. 16995/1973 and U.S. Pat. No. 3,812,061).

However, such a method has a drawback that depolymerization takes place during the chlorination treatment whereby the molecular weight of the polymer will be substantially lowered, and the mechanical properties of the polymer will thereby be degraded (e.g. Journal of Applied Polymer Science, Vol. 12, p. 2065).

Under the circumstances, it has long been wanted to develop a technique capable of imparting to the polymer fire resistance, fusion resistance and heat resistance by chlorination of the polymer starting material without impairing the desirable properties of the polymer starting material.

SUMMARY OF THE INVENTION

The present inventor has conducted an extensive research on the chlorination of the polymer and, as a result, has found that it is possible to obtain a chlorinated polymer having substantially the same molecular weight distribution as that of the polymer starting material by electrolytically chlorinating the polymer at room temperature or a temperature around the room temperature, and that it is possible to obtain a polymer having an optional degree of chlorination by controlling the electricity to pass for the electrolysis. Thus, the present invention has been accomplished.

Namely, the present invention provides a method for preparing a chlorinated polymer, which comprises dissolving a polymer represented by the general formula

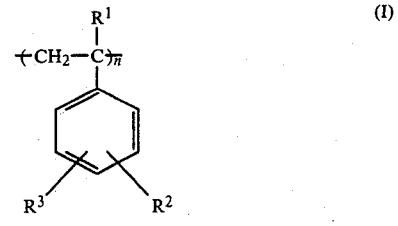

where $R^1$, $R^2$ and $R^3$ may be the same or different and each represents hydrogen or a $C_1$–$C_6$ lower alkyl group, and n is an integer of from 50 to 30,000, in an organic solvent, and subjecting it to an electrolytic reaction in the presence of an aqueous solution containing chlorine ions.

DETAILED DESCRIPTION OF THE PREFERRED EMBODIMENTS

The polymer represented by the above general formula I to be used in the present invention includes, e.g. polystyrene, polyvinyl toluene, polyvinyl xylene, poly-α-methylstyrene and polydivinyl benzene.

The polymer concentration in the organic solvent may be from 0.1 to 50% by weight, preferably from 1 to 20% by weight.

The organic solvent may be any solvent so long as the polymer dissolved therein does not precipitate when the solvent is mixed with the aqueous solution containing chlorine ions. It is preferably a chlorinated hydrocarbon solvent such as chloroform, methylene chloride, carbon tetrachloride, ethylene dichloride, trichloroethane or tetrachloroethylene.

As the chlorine source, any salt may be used so long as it contains chlorine, is soluble in water, serves as a supporting electrolyte and has electric conductivity to permit the electrolysis. For instance, there may be mentioned a metal salt such as lithium chloride, sodium chloride, potassium chloride, calcium chloride, iron chloride, cobalt chloride or copper chloride; an ammonium salt such as ammonium chloride, tetramethyl ammonium chloride, tetraethyl ammonium chloride or tetrabutyl ammonium chloride; and hydrochloric acid. Preferred is hydrochloric acid.

The amount of the chlorine ions is at least a stoichiometric amount required for the preparation of a polymer having a desired degree of chlorination.

The pH of the aqueous solution is within a range of from 1 to 10, preferably not higher than 5.

As the pH becomes higher, the electrolytic chlorination reaction tends to hardly proceed. When the electrolytic reaction of the polymer is conducted at a pH of 14, depolymerization of the polymer proceeds and a chlorinated polymer is hardly obtainable.

To adjust the pH, there may be added, in addition to the above mentioned salt and hydrochloric acid, a mineral acid such as sulfuric acid or phosphoric acid, or an organic acid such as formic acid, acetic acid, propionic acid, benzene sulfonic acid or p-toluene sulfonic acid, as a supporting electrolyte.

The concentration of the supporting electrolyte in the aqueous solution is from 10 to 60% by weight, preferably from 20 to 50% by weight. The organic solvent may be used in an amount of from 10 to 500 parts by volume, preferably from 50 to 200 parts by volume relative to 100 parts by volume of the aqueous solution.

The electrodes may be made of carbon, graphite or any optional inactive metal such as copper, palladium, stainless steel, platinum, ruthenium, nickel, chromium or gold, or an alloy thereof. In order to obtain the best result according to the present invention, it is preferred to use, as the anode, an electrode made of platinum, graphite or titanium coated with ruthenium oxide, while the cathode may be made of any material which is inert to the reaction. The reaction is carried out at a voltage of from 2 to 100 volts taken from an ordinary power source. The current density may be chosen from a relatively wide range of from 0.001 to 5 A/cm$^2$, preferably from 0.01 to 0.5 A/cm$^2$.

The reaction may be carried out at room temperature. It is usually preferred to carry out the reaction at a temperature of from 0° to 40° C. If the reaction temperature exceeds 50° C., depolymerization of the polymer proceeds, such being undesirable.

The reaction is usually carried out under atmospheric pressure. However, if required, the present invention may be carried out under elevated pressure or under reduced pressure.

The electrolytic cell used in the present invention may be either a divided electrolytic cell or an undivided electrolytic cell. When a divided electrolytic cell is used, the reaction of the present invention takes place in the anode compartment.

Further, in order to obtain the best result in the reaction, it is preferred that the organic phase and the aqueous phase are sufficiently stirred.

According to the present invention, it is possible to readily prepare a chlorinated polymer by dissolving the polymer in the solvent and subjecting it to an electrolytic reaction in the presence of the aqueous solution containing chlorine ions at an ordinary temperature or a temperature around the ordinary temperature, and it is further possible to prepare a polymer having an optional degree of chlorination by controlling the electricity to pass.

According to the conventional methods for chlorination of the polymer, the polymer undergoes depolymerization and the chlorinated polymer thereby obtained has inferior mechanical strength. Whereas, according to the present invention, such depolymerization of the polymer is scarcely observed and it is possible to obtain a chlorinated polymer having substantially the same molecular weight distribution as that of the polymer starting material.

The present invention will be described in further detail with reference to Examples.

EXAMPLE 1

0.5 g of polystyrene (average molecular weight: 40,000 Mw/Mn=2.3) dissolved in 10 ml of methylene chloride and 10 ml of 35% concentrated hydrochloric acid were introduced into a 50 ml beaker-type electrolytic cell and two platinum electrodes (0.7 $\phi \times$ 300 mm) were inserted. While sufficiently stirring the electrolytic solution with a magnetic stirrer, electrolysis was conducted at a constant current of 0.5 A for 40 minutes.

The terminal voltage was 7 V and the reaction temperature was 20° C. After completion of the reaction, the organic phase was separated and poured into 100 ml of methanol, whereby 0.61 g of chlorinated polystyrene was obtained.

The chlorine content of the chlorinated polystyrene was 25.6% and Mw/Mn was 2.3.

EXAMPLE 2

0.56 g of chlorinated polystyrene was obtained in the same manner as in Example 1 except that 10 ml of chloroform was used instead of 10 ml of methylene chloride.

The chlorine content was 19.0% and Mw/Mn was 2.3.

EXAMPLE 3

0.63 g of chlorinated polystyrene was obtained in the same manner as in Example 1 except that 10 ml of carbon tetrachloride was used instead of 10 ml of methylene chloride.

The chlorine content was 28.2% and Mw/Mn was 2.32.

EXAMPLE 4

0.62 g of chlorinated polystyrene was obtained in the same manner as in Example 1 except that 10 ml of ethylene dichloride was used instead of 10 ml of methylene chloride.

The chlorine content was 20.1% and Mw/Mn was 2.40

EXAMPLE 5

0.52 g of chlorinated polystyrene was obtained in the same manner as in Example 1 except that 2 graphite electrode sheets (15 mm$\times$30 mm$\times$2$^t$) were used instead of the platinum electrodes.

The chlorine content was 13.2% and Mw/Mn was 2.3.

EXAMPLE 6

0.58 g of chlorinated polystyrene was obtained in the same manner as in Example 1 except that an electrode (the electrode surface area of 3.0 cm$^2$) made of titanium plated with ruthenium oxide was used as the anode instead of the platinum electrode.

The chlorine content was 21.3% and Mw/Mn was 2.3.

EXAMPLE 7

0.57 g of chlorinated polystyrene was obtained in the same manner as in Example 1 except that an electrolytic current of 0.2 A was supplied instead of 0.5 A.

The chlorine content was 20.6% and Mw/Mn was 2.3.

EXAMPLE 8

0.66 g of chlorinated polystyrene was obtained in the same manner as in Example 7 except that the reaction time was 100 minutes instead of 40 minutes.

The chlorine content was 27.6% and Mw/Mn was 2.32.

EXAMPLE 9

0.54 g of chlorinated polystyrene was obtained in the same manner as in Example 1 except that the reaction time was 15 minutes instead of 40 minutes.

The chlorine content was 11.5% and Mw/Mn was 2.30.

EXAMPLE 10

0.48 g of chlorinated polystyrene was obtained in the same manner as in Example 1 except that the reaction time was 30 minutes instead of 40 minutes.

The chlorine content was 22.7% and Mw/Mn was 1.01.

EXAMPLE 11

0.62 g of chlorinated polystyrene was obtained in the same manner as in Example 1 except that 0.5 g of polystyrene having an average molecular weight of 5,000 (Mw/Mn=1.58) was used.

The chlorine contact was 26.3% and Mw/Mn was 1.60.

EXAMPLE 12

0.64 g of chlorinated polystyrene was obtained in the same manner as in Example 1 except that 0.5 g of polysytrene having an average molecular weight of 20,000 (Mw/Mn=1.90) was used.

The chlorine content was 26.5% and Mw/Mn was 1.82.

EXAMPLE 13

0.64 g of chlorinated polystyrene was obtained in the same manner as in Example 1 except that 0.5 g of standard polystyrene (average molecular weight: 40,000, Mw/Mn=1.01, manufactured by Toyo Soda Manufacturing Co. Ltd.) was used as the polystyrene.

The chlorine content was 25.7% and Mw/Mn was 1.01.

EXAMPLE 14

0.61 g of chlorinated polystyrene was obtained in the same manner as in Example 1 except that 0.5 g of standard polystyrene (average molecular weight: 100,000, Mw/Mn=1.01, manufactured by Toyo Soda Manufacturing Co. Ltd.) was used as the polystyrene.

The chlorine content was 22.3% and Mw/Mn was 1.03.

EXAMPLE 15

0.63 g of chlorinated polystyrene was obtained in the same manner as in Example 1 except that 0.5 g of standard polystyrene (average molecular weight: 200,000, Mw/Mn=1.01, manufactured by Toyo Soda Manufacturing Co. Ltd.) was used as the polystyrene.

The chlorine content was 22.3% and Mw/Mn was 1.02.

EXAMPLE 16

0.60 g of chlorinated polystyrene was obtained in the same manner as in Example 1 except that polystyrene (Mw/Mn=2.30) having an average molecular weight of 800,000 was used as the polystyrene.

The chlorine content was 14.3% and Mw/Mn was 2.31.

EXAMPLE 17

0.32 g of chlorinated polystyrene was obtained in the same manner as in Example 1 except that 0.3 g of polystyrene (Mw/Mn=3.21) having an average molecular weight of 2,800,000 was used as the polystyrene.

The chlorine content was 10.2% and Mw/Mn was 3.2.

EXAMPLE 18

1.23 g of chlorinated polystyrene was obtained in the same manner as in Example 1 except that 1 g of polystyrene and 20 ml of methylene chloride were used and the reaction time was 80 minutes.

The chlorine content was 25.4% and Mw/Mn was 2.28.

EXAMPLE 19

0.58 g of chlorinated polystyrene was obtained in the same manner as in Example 1 except that 20 ml of concentrated hydrochloric acid was used.

The chlorine content was 19.3% and Mw/Mn was 2.31.

EXAMPLE 20

0.48 g of chlorinated polystyrene was obtained in the same manner as in Example 1 except that 20% hydrochloric acid was used instead of 35% hydrochloric acid.

The chlorine content was 8.2% and Mw/Mn was 2.32.

EXAMPLE 21

0.48 g of chlorinated polystyrene was obtained in the same manner as in Example 1 except that 10 ml of a 35% sodium chloride aqueous solution was used instead of hydrochloric acid and the electrolysis was conducted at pH 5 to 6.

The chlorine content was 3.5% and Mw/Mn was 2.31.

EXAMPLE 22

0.47 g of chlorinated polystyrene was obtained in the same manner as in Example 1 except that 10 ml of an aqueous ammonium chloride was used instead of hydrochloric acid and the electrolysis was conducted at pH 3 to 5.

The chlorine content was 2.8% and Mw/Mn was 2.31.

EXAMPLE 23

0.58 g of chlorinated polystyrene was obtained in the same manner as in Example 1 except that 3.5 g of sodium chloride was dissolved in 10 ml of a 20% sulfuric acid aqueous solution instead of 3.5 g and the electrolysis was carried out at pH 1.

The chlorine content was 16.2% and Mw/Mn was 2.30.

EXAMPLE 24

0.69 g of chlorinated polyvinyl toluene was obtained in the same manner as in Example 1 except that 0.5 g of polyvinyl toluene (average molecular weight: $3.95 \times 10^5$, Mw/Mn=1.02) was used instead of polystyrene.

The chlorine content was 33.5% and Mw/Mn was 1.02.

EXAMPLE 25

0.61 g of chlorinated poly-α-methylstyrene was obtained in the same manner as in Example 3 except that 0.5 g of poly-α-methylstyrene (average molecular weight: $3.72 \times 10^5$, Mw/Mn=2.10) was used instead of polystyrene.

The chlorine content was 22.3% and Mw/Mn was 2.15.

I claim:

1. A method for preparing a chlorinated vinyl aromatic polymer, which comprises: admixing a vinyl aromatic polymer represented by the formula:

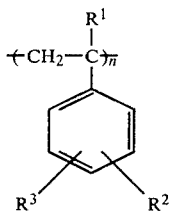

where $R^1$, $R^2$ and $R^3$ may be the same or different and each represents hydrogen or a $C_1$-$C_6$ lower alkyl group, and n is an integer from 50 to 30,000 with an organic solvent which will dissolve said polymer; and subjecting said polymer to an electrolytic reaction in the presence of an aqueous solution containing chlorine ions.

2. The method according to claim 1 wherein said vinyl aromatic polymer is selected from the group consisting of polystyrene, polyvinyl toluene, polyvinyl xylene, poly-α-methylstyrene and polydivinyl benzene.

3. A method for preparing a chlorinated vinyl aromatic polymer, which comprises:

admixing a vinyl aromatic polymer represented by the formula:

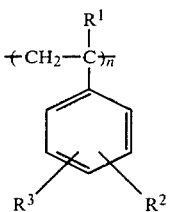

where $R^1$, $R^2$ and $R^3$ may be the same or different and each represents a hydrogen or a $C_1$-$C_6$ lower alkyl group, and n is an integer from 50 to 30,000, with an organic solvent which will dissolve said polymer; the concentration of said vinyl aromatic polymer dissolved in said organic solvent is from 0.1 to 50% by weight; and subjecting said vinyl aromatic polymer to an electrolytic reaction in the presence of an aqueous solution containing chlorine ions.

4. The method according to claim 3 wherein the concentration of said vinyl aromatic polymer dissolved in said organic solvent is from 1 to 20% by weight.

5. The method according to claim 3 wherein said organic solvent is selected from chloroform, methylene chloride, carbon tetrachloride, ethylene dichloride, trichloroethane and tetrachloroethylene.

6. The method according to claim 3 wherein said aqueous solution is an aqueous hydrochloric acid solution.

7. The method according to claim 3 wherein said aqueous solution is an aqueous solution of lithium chloride, sodium chloride, potassium chloride, calcium chloride, iron chloride, cobalt chloride, copper chloride, ammonium chloride, tetramethyl ammonium chloride, tetraethyl ammonium chloride, or tetrabutyl ammonium chloride.

8. The method according to claim 3 wherein said aqueous solution has a pH of from 1 to 10.

9. The method according to claim 8 wherein a supporting electrolyte selected from the group consisting of sulfuric acid, phosphoric acid, formic acid, propionic acid, benzene sulfonic acid and p-toluene sulfonic acid is added to control the pH of said aqueous solution.

10. The method according to claim 9 wherein the concentration of said supporting electrolyte in said aqueous solution is from 10 to 60% by weight.

11. The method according to claim 10 wherein the concentration of said supporting electrolyte is from 20 to 50% by weight of said aqueous solution.

12. The method according to claim 8 wherein said aqueous solution has a pH of 1 to 5.

13. The method according to claim 3 wherein said organic solvent is used in an amount of from 10 to 500 parts by volume relative to 100 parts by volume of said aqueous solution.

14. The method according to claim 13 wherein said organic solvent is used in an amount of from 50 to 200 parts by volume relative to 100 parts by volume of said aqueous solution.

15. The method according to claim 3 wherein said electrolytic reaction is carried out at current density of from 0.0001 to 5 A/cm².

16. The method according to claim 3 wherein said electrolytic reaction is carried out at a temperature of from 0° to 40° C.

17. A method for preparing a chlorinated vinyl aromatic polymer, which comprises:

admixing a vinyl aromatic polymer represented by the formula:

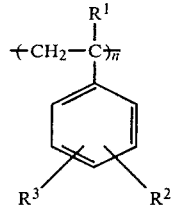

where $R^1$, $R^2$ and $R^3$ may be the same or different and each represents hydrogen or $C_1$-$C_6$ lower alkyl group and n is an integer from 50 to 30,000 with an organic solvent which will dissolve said polymer; and subjecting said polymer to an electrolytic reaction in the presence of a solution containing chlorine ions; said solution being an aqueous solution of lithium chloride, potassium chloride, calcium chloride, iron chloride, cobalt chloride, copper chloride, ammonium chloride, tetramethyl ammonium chloride, tetraethyl ammonium chloride or tetrabutyl ammonium chloride, and wherein a supporting electrolyte selected from the group consisting of sulfuric acid, phosphoric acid, formic acid, propionic acid, benzene sulfonic acid and p-toluene sulfonic acid is added to control the pH of said aqueous solution.

* * * * *